C. LARSON.
END GATE.
APPLICATION FILED SEPT. 9, 1914.
1,134,877.
Patented Apr. 6, 1915.
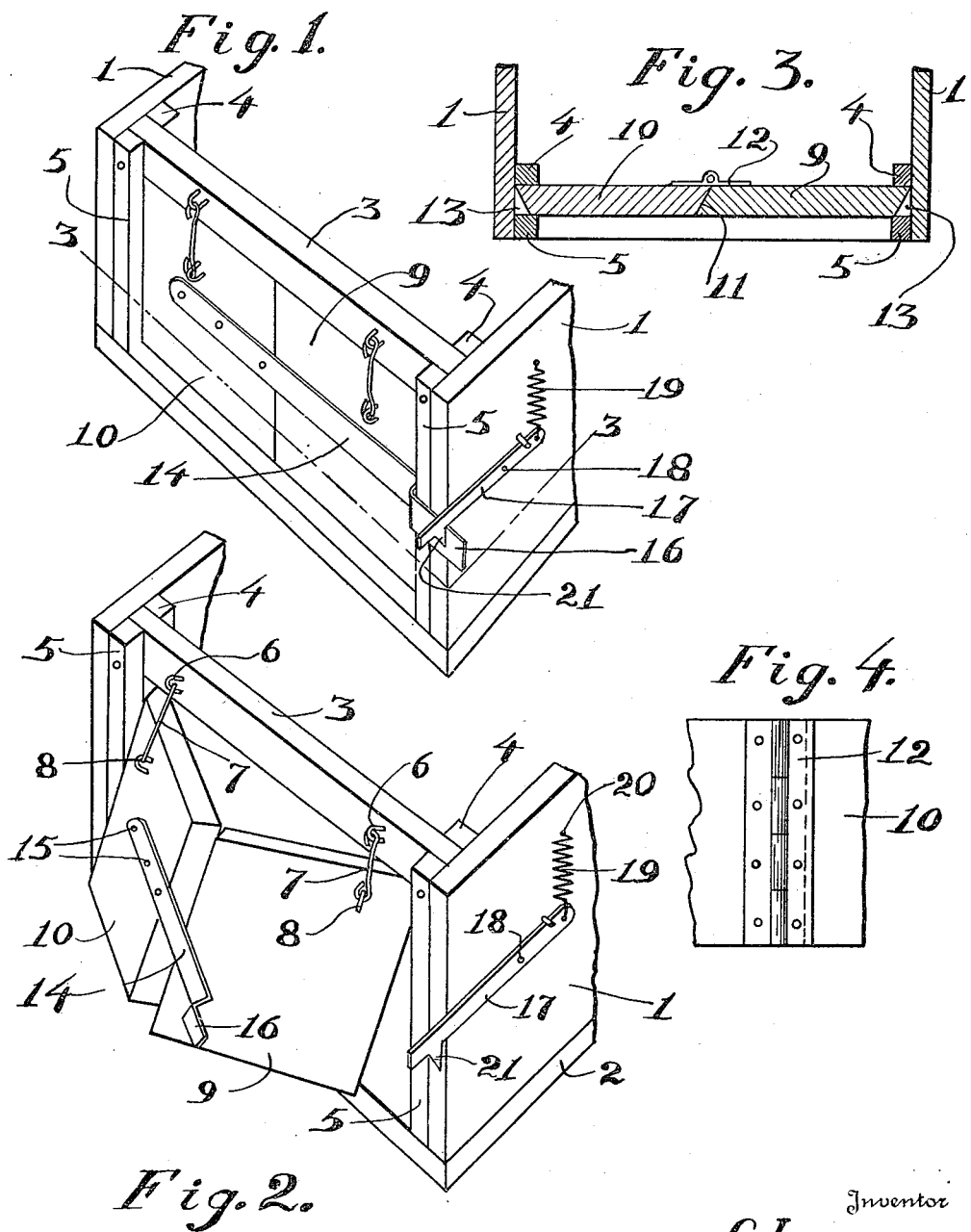

UNITED STATES PATENT OFFICE.

CHRIS LARSON, OF BLAIRSTOWN, IOWA.

END-GATE.

1,134,877.  Specification of Letters Patent.  Patented Apr. 6, 1915.

Application filed September 9, 1914. Serial No. 860,868.

*To all whom it may concern:*

Be it known that I, CHRIS LARSON, a citizen of the United States, residing at Blairstown, in the county of Benton and State of Iowa, have invented certain new and useful Improvements in Vehicle End-Gates; and I do hereby declare the following to be a full, clear, and exact description of the invention, such as will enable others skilled in the art to which it appertains to make and use the same.

This invention relates to end gates for vehicles, and one of the principal objects of the invention is to provide an end gate which cannot become detached from the vehicle, which can be readily operated from one side of the wagon box, and which will swing out of the way for dumping the contents of the wagon box.

Another object of the invention is to provide an end gate, suspended from a cross bar at the top of the rear end of the box, said end gate being formed of two hinged sections which will swing up out of the way to dump the contents of the wagon box.

The foregoing and other objects may be attained by means of the construction illustrated in the accompanying drawing, in which, Figure 1 is a perspective view of the end gate closed, and the sides of the wagon box being broken away, Fig. 2 is a perspective view of the end gate opened, Fig. 3 is a horizontal sectional view taken on the line 3—3 of Fig. 1, and Fig. 4 is a detail rear elevation of the two sections of the end gate hinged together.

This invention is designed more particularly for use on a grain wagon, and the end gate is designed to open to let the grain discharge without removing the gate.

Referring to the drawing, the numeral 1 designates the sides of the wagon box, 2 is the bottom, and 3 is a cross bar which extends across between the sides 1 of the box and is secured at the rear end thereof by cleats 4 and 5. Suspended from the cross bar 3 are the end gate sections, a pair of staples 6 being secured to the cross bar and links 7 connected to the staples 6 are secured by means of staples 8 to the two members 9 and 10 of the end gate. The sections 9 and 10 are oppositely beveled where they meet in the center as shown at 11 and a hinge 12 is secured to said sections 9 and 10, to permit the latter to move outwardly in opening the gate. The outer edges 13 of the end gate sections are also beveled, as shown more clearly in Fig. 3.

A latch 14 is connected by suitable fastenings 15 to the section 10 of the end gate, and said latch is provided with an offset portion 16 which extends out beyond the sides of the wagon box when the gate is closed. A lever or lock 17 is pivoted at 18 to the side 1 and is provided with a spring 19 secured to one end of said lever at one end of the spring, and the opposite end of the spring is secured at 20 to the side board 1. The front end of the lever 17 is provided with a lug 21 which fits over the projection 16 of the latch to hold both end gate sections closed. The tension of the spring 19 is to draw upward on the lever 17 at that end and hold the front end of the lever down upon the projection 16.

From the foregoing it will be obvious that when the lever 17 is raised the pressure of the grain against the inner side of the members 9 and 10 will throw the latter outward to the position shown in Fig. 2 of the drawing and permit the contents of the wagon to be discharged or dumped. The gate can be readily closed after the wagon load has been discharged.

An end gate made in accordance with this invention is easily operated, is simple in construction, cannot be readily lost from the end of the vehicle, and can be manufactured at low cost.

Various changes may be made in the details of construction without departing from the spirit and scope of the invention as defined in the claim.

What is claimed is:—

An end gate comprising a cross bar connected to the rear end of the wagon box, said end gate comprising two sections, links connected to the cross bar and said sections, the latter being hinged together centrally, a latch being secured to one of the sections and extending beyond the opposite side of the wagon box, and a lever or lock provided with lugs for holding the latch, and a spring for holding the lever in contact with the latch.

In testimony whereof I affix my signature in presence of two witnesses.

CHRIS LARSON.

Witnesses:
P. H. LYNCH,
P. J. WOOD.